United States Patent Office.

ALLEN HISEY, OF TAMA CITY, IOWA.

Letters Patent No. 114,941, dated May 16, 1871.

IMPROVEMENT IN TANNING COMPOUNDS.

The Schedule referred to in these Letters Patent and making part of the same.

*To all whom it may concern:*

Be it known that I, ALLEN HISEY, of Tama City, in the county of Tama and State of Iowa, have discovered a new and useful Improvement in Tanning Compounds; and I do hereby declare the following to be a full, clear, and exact description thereof.

This discovery has reference to an improved tanning compound; and

It consists of the constituent parts thereof, when compounded in the manner and the proportions hereinafter described.

To enable others to make and use my discovery, I will proceed to describe it.

In the first instance, take five (5) pounds of dried smart-weed and place it in a suitable vessel, and pour upon the same ten (10) gallons of boiling water, after which cover the said vessel and let its contents remain until cool, at which time remove the smart-weed, further use thereof being no longer required.

The next step to be pursued is to take a portion of the smart-weed liquor, produced as above set forth, and place it in a brass or copper vessel, with four (4) pounds of terra japonica, one (1) pound of alum, and one (1) pound of salt, and expose the same to sufficient heat to cause them to dissolve and form a part of the smart-weed liquor, and stir or agitate the same occasionally until the dissolution of the said ingredients is obtained.

The mixture is now incorporated with the dried smart-weed liquor, described in the first instance, and the whole thoroughly mixed together by agitating or stirring the same, thus producing a superior and desirable tanning compound.

Having thus described my discovery,

What I claim, and desire to secure by Letters Patent, is—

The tanning compound, composed of the ingredients and compounded in the manner and the proportions substantially as herein set forth.

In testimony that I claim the foregoing I hereunto sign my name in presence of two subscribing witnesses this 28th day of February, A. D. 1871.

ALLEN HISEY.

Witnesses:
J. P. ELLIS,
B. F. PARTRIDGE.